(12) United States Patent
Klug et al.

(10) Patent No.: US 8,302,910 B2
(45) Date of Patent: Nov. 6, 2012

(54) PRESSURE BULKHEAD FOR AN AIRCRAFT

(75) Inventors: Markus Klug, Dachau (DE); Herbert Hoernlein, Landsham (DE)

(73) Assignee: EADS Deutschland GmbH, Ottobrunn (DE)

( * ) Notice: Subject to any disclaimer, the term of this patent is extended or adjusted under 35 U.S.C. 154(b) by 962 days.

(21) Appl. No.: 12/269,597

(22) Filed: Nov. 12, 2008

(65) Prior Publication Data

US 2009/0137196 A1 May 28, 2009

(30) Foreign Application Priority Data

Nov. 13, 2007 (DE) .................... 10 2007 054 101

(51) Int. Cl.
*B64C 1/10* (2006.01)
(52) U.S. Cl. .................... 244/121; 244/219
(58) Field of Classification Search ............ 244/121, 244/119
See application file for complete search history.

(56) References Cited

U.S. PATENT DOCUMENTS

| | | | |
|---|---|---|---|
| 7,766,277 B2 * | 8/2010 | Anderson et al. | 244/121 |
| 2002/0050157 A1 | 5/2002 | Kennerknecht et al. | |
| 2007/0164159 A1 * | 7/2007 | Koch et al. | 244/121 |
| 2008/0149769 A1 * | 6/2008 | Koch et al. | 244/121 |
| 2008/0173765 A1 * | 7/2008 | Muller et al. | 244/158.1 |
| 2010/0155533 A1 * | 6/2010 | McKinnie et al. | 244/121 |
| 2010/0258673 A1 * | 10/2010 | Garcia Laja et al. | 244/121 |

FOREIGN PATENT DOCUMENTS

EP 0 847 916 A2 6/1998

OTHER PUBLICATIONS

An Office Action that issued with respect to DE 10 2007 054 101.7.

\* cited by examiner

*Primary Examiner* — Christopher P Ellis
(74) *Attorney, Agent, or Firm* — Greenblum & Bernstein, P.L.C.

(57) ABSTRACT

A pressure bulkhead for an aircraft, a method of manufacturing an aircraft, and an aircraft. The bulkhead includes at least one anticlastic shaped surface element. The instant abstract is neither intended to define the invention disclosed in this specification nor intended to limit the scope of the invention in any way.

20 Claims, 3 Drawing Sheets

10

8

10i

10

PRESSURE BULKHEAD FOR AN AIRCRAFT

CROSS-REFERENCE TO RELATED APPLICATIONS

The present application claims priority under 35 U.S.C. §119 of German Patent Application No. 10 2007 054 101.7 filed Nov. 13, 2007, the disclosure of which is expressly incorporated by reference herein in its entirety.

BACKGROUND OF THE INVENTION

1. Field of the Invention

The invention relates to the construction method and the geometry for the pressure bulkhead of a fuselage, which seals a spatial area therein in a pressure-tight manner.

2. Discussion of Background Information

With larger transport aircraft, the fuselage for passengers and freight is stressed by the cabin pressure. In the area of the landing gear, only the cabin area is under pressure, such that the shaft for extending and retracting the landing gear is exposed to ambient pressure. This pressure difference is absorbed by a horizontal 1 and a vertical 2 bulkhead (see FIGS. 1 and 2), which as a rule are embodied in each case in a flat manner. The horizontal bulkhead is located directly under the floor of the cabin and is connected to the vertical bulkhead that separates the landing gear area from the freight area.

In the metal construction method, it is usual to embody the bulkheads from reinforced flat plates. In an alternative construction method, the pressure bulkhead, typically the horizontal bulkhead, comprises a lining-up of several single-curved pans that are shaped from metal sheets. Both construction methods are known and are used with transport aircraft. The size of the semi-finished products used, either sheets or plates, and the production methods set the limits for an integral construction method. A reinforced plate can be milled from one piece, whereas pan sheets have to be shaped individually and then joined with rivets or bolts together with reinforcing elements to form the bulkhead. For very large components it can be necessary for reasons of cost, semi-finished products, or other reasons related to machine processing to design a differential construction method that provides joints of the components with rivet and bolt connections.

In aircraft construction, the aluminum alloys are being more and more replaced by carbon fiber composite materials. In this manner even lighter structures can be designed, which can be produced at least at no additional cost compared to aluminum. Fibrous composite construction methods render possible highly integral large structural components that are not possible in metal in this manner. Thus, the costs of the joining technology are saved and compensates in part for the higher price for semi-finished product, material and production method.

With the introduction of carbon fibrous composite materials in lieu of aluminum, new, material-adapted solutions for pressure bulkheads must be developed in aircraft construction. The production of reinforcement profiles in fiber composite technology is cost-intensive and cannot compete with conventional metal construction methods. Surfaces with different thicknesses and local reinforcements, as well as curved surfaces, can be produced easily and with cost advantages compared to aluminum.

SUMMARY OF THE INVENTION

Accordingly, embodiments of the invention embody or form horizontal and vertical pressure bulkhead of a transport aircraft in a light and cost-effective construction method. In exemplary embodiments, such pressure bulkheads absorb overpressure as well as underpressure from the cabin of the transport aircraft without breaking down in a manner critical to stability.

According to embodiments of the invention, the horizontal as well as the vertical bulkhead may be placed by an anticlastic surface, i.e., a double-curved surface with the curvatures in opposite directions. A surface is called anticlastic when the center points of its two radii of curvature lie on the opposite sides of the surface. An anticlastic surface is also referred to as a saddle surface.

The pressure bulkhead according to embodiments of the invention is well suited for production in the fiber composite method of construction. Through the use of the double-curved surfaces curved in opposite directions, reinforcement profiles can be dispensed with in the case of pressure bulkheads of this type. The compressive loads occurring for the bulkhead are removed through tensile stresses and compressive stresses in the surface. Moreover, a weight-efficient component can be achieved. Since the reinforcement elements are eliminated, the costs for expensive profile production and for positioning on the shell in fiber composite technology can also eliminated. The embodiment of a double-curved structure with optional local reinforcements can be easily possible in fiber composite technology. All known materials (e.g., carbon fibers, glass fibers, aramid fibers) are suitable as fiber material.

The following fiber composite methods in particular can be used for the production of the pressure bulkheads according to the invention:

(1) Prepreg Method:

Prepreg technology is currently dominant for the production of components in carbon fiber composite materials in aircraft construction. For the production of non-developable surfaces, the fact is thereby utilized that the layers are built up individually and the respective prepreg strips are laid on the surface in webs parallel to one another. If the strips are not too wide, they conform to the contour of the surface. Slight variations in the gap width between the strips additionally compensate for inadequate conforming behavior.

(2) Resin Infusion and Injection Methods:

Recently so-called resin infusion and injection methods have become increasingly important. For complicated surfaces with multiple curves, the draping ability of the dry woven fabric or scrim fabric is utilized, which adapts to the surfaces better than a prepreg strip. Dry woven fabric or scrim fabric can thus be more easily draped on surfaces of this type than prepreg. This construction method is therefore particularly suitable for resin infusion methods.

The construction method according to embodiments of the invention for the pressure bulkhead renders possible a cost-effective production and a reduction in the weight of the component.

The saddle-shaped pressure bulkhead according to the invention can in general replace two (in particular flat or single-curved) pressure bulkheads, which are arranged at a certain acute or obtuse angle (e.g., between 80° and 135°) to one another.

Embodiments of the invention are directed to a pressure bulkhead for an aircraft. The bulkhead includes at least one anticlastic shaped surface element.

According to aspects of the invention, the at least one anticlastic surface element can correspond to a minimal surface. Further, the at least one anticlastic surface element may be formed with an elastic layer that is modifiable for adjustment to at least one of predetermined construction space restrictions and interior pressure according to an orthotropic prestressing method.

In accordance with other aspects of the invention, the at least one anticlastic shaped surface element may be formed of a fiber composite material.

According to other aspects of the invention, the at least one anticlastic shaped surface element can include a plurality of anticlastic partial surface elements. The plurality of anticlastic shaped surface elements can respectively correspond to a minimal surface. Further, at least one of the plurality of anticlastic shaped surface elements may be formed with an elastic layer that is modifiable for adjustment to at least one of predetermined construction space restrictions and interior pressure according to an orthotropic prestressing method. Moreover, the plurality of anticlastic shaped surface elements can be formed of a fiber composite material.

Embodiments of the invention are directed to a method of manufacturing an aircraft. The method includes forming a bulkhead with at least one anticlastic shaped surface element, and coupling the bulkhead to a fuselage of the aircraft.

In accordance with aspects of the invention, the at least one anticlastic shaped surface element may be formed to correspond to a minimal surface.

According other aspects of the invention, the method can also include modifying the at least one anticlastic shaped surface element through an orthotropic prestressing method on an elastic layer to adjust for at least one of predetermined construction space restrictions and interior pressure.

Still further, the at least one anticlastic shaped surface element can include a plurality of anticlastic shaped surface elements arranged adjacent each other.

According to further aspects of the invention, the at least one anticlastic shaped surface element may be formed of a fiber composite material.

Embodiments of the invention are directed to an aircraft. The aircraft includes a bulkhead having a saddle shape with a radius of curvature on each surface, and a fuselage to which the bulkhead is coupled.

In accordance with still yet further aspects of the invention, the bulkhead can be formed of a fiber composite material. Further, the bulkhead can be formed with a scallop shell surface shape and the bulkhead can be of a unitary construction or can include a plurality of adjacently arranged elements. The plurality of adjacently arranged elements can include anticlastic shaped elements.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
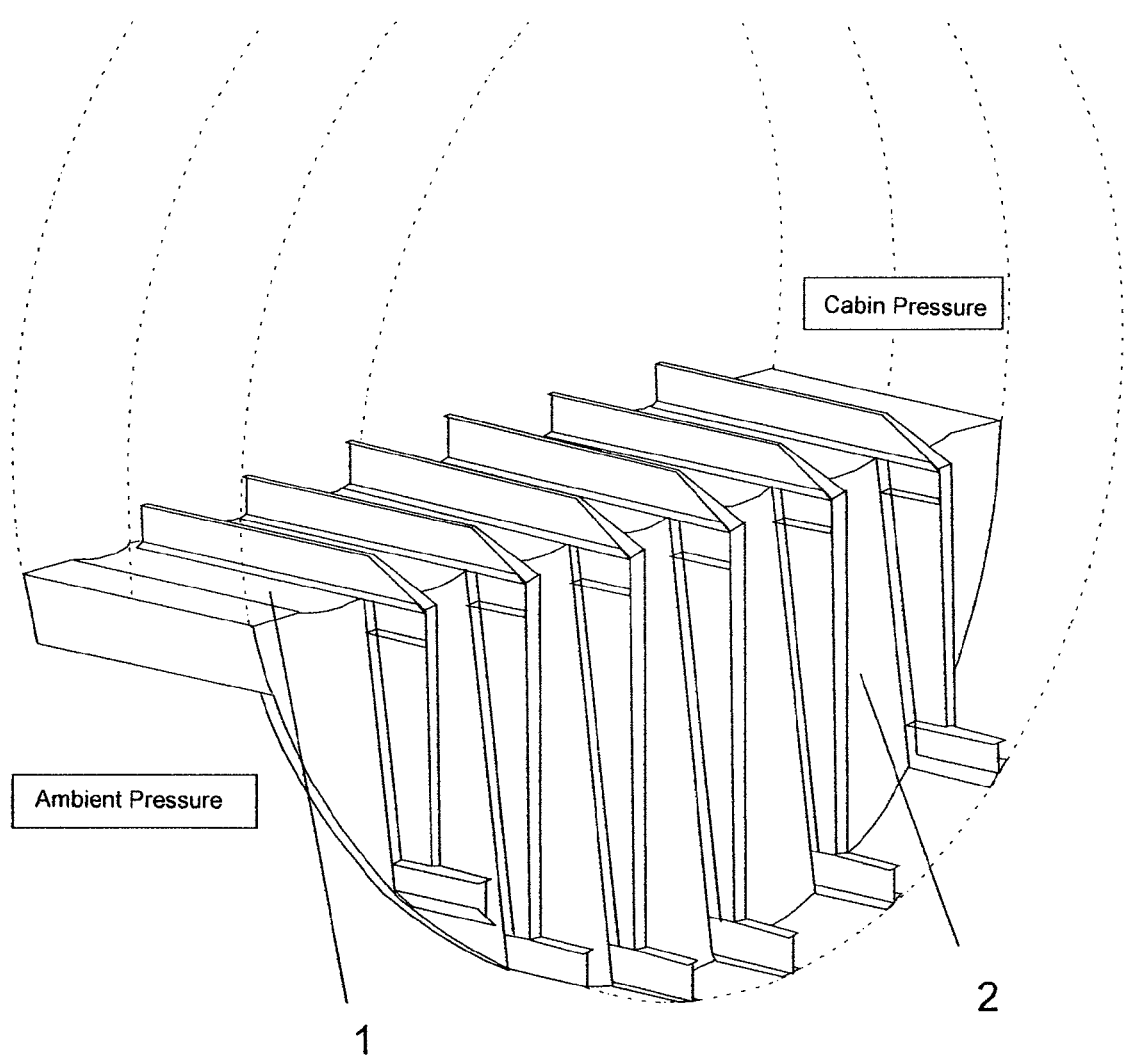
FIG. 1 illustrates a conventional pressure bulkhead in an aircraft fuselage.
Figure 2:
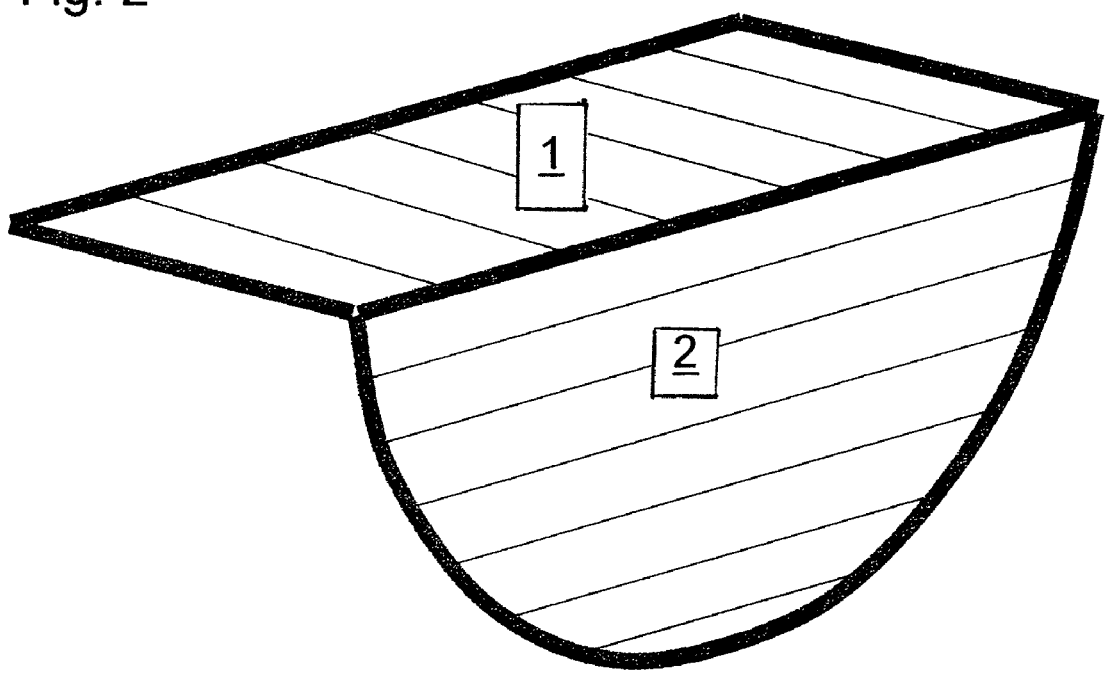
FIG. 2 diagrammatically illustrates a conventional horizontal and vertical pressure bulkhead in diagrammatical representation.
Figure 3:
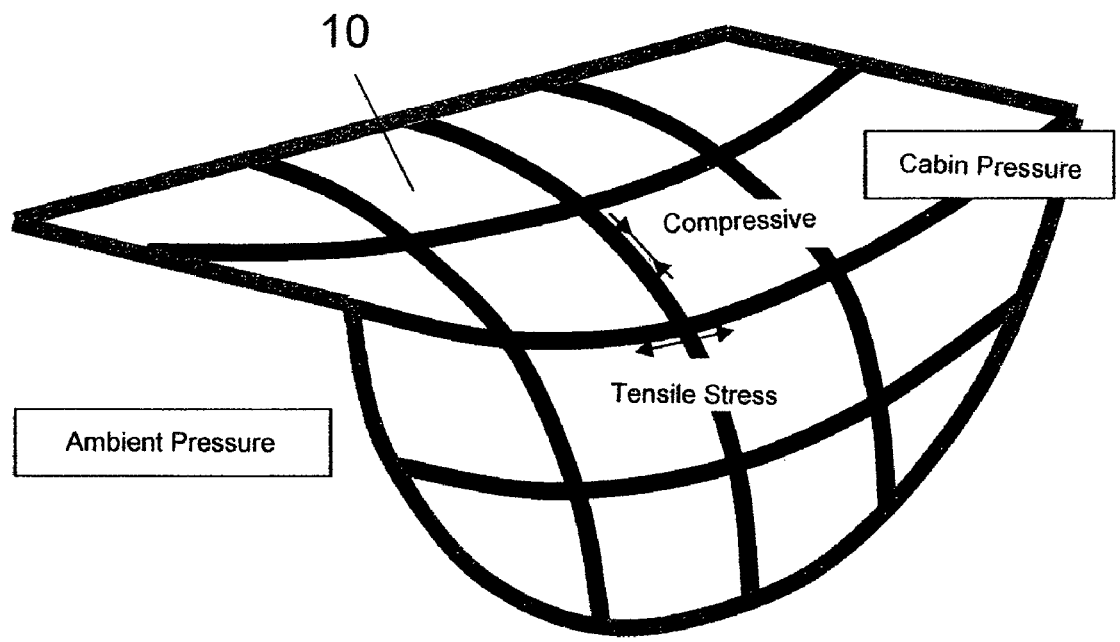
FIG. 3 illustrates a pressure bulkhead according to the invention that is embodied or formed as a saddle surface.

According to embodiments of the invention, horizontal bulkhead 1 and vertical bulkhead 2 (see FIGS. 1 and 2) are replaced with a saddle surface 10, shown by way of example in FIG. 3. Saddle surface 10 can be embodied or formed with a surface curved in opposite directions, which is called anticlastic.

The normal pressure generates compressive stresses in a main direction, while tensile stresses form in the second main direction. This property provides that the tensile stresses increase the compressive stresses that are critical to the stability of this surface. In this way, an early buckling of the shell can be prevented. A synclastic surface, that is, a shell with curvatures in the same direction, such as, e.g., an ellipsoid, would always build up exclusively compressive stresses or tensile stresses in the main directions. With thin wall thicknesses and corresponding compressive stresses, this type of shell can suddenly buckle or collapse because the shell breaks down. With the saddle surface according to embodiments of the invention there is no danger of instability until comparatively higher pressures. Because of the curvature in opposite directions, the anticlastic shell can even absorb pressures up to a high degree from the opposite direction without breaking down. Thus, the pressure bulkhead of the invention meets these stability criteria without the installation of additional reinforcement elements.

The optimal contour in terms of weight of a saddle surface according to embodiments of the invention corresponds to the so-called minimal surface. The minimal surface is the smallest surface that is calculated when the edge of this surface is firmly defined and the curvatures are left variable. In practice, the minimal surface can be visualized with a soap film for a correspondingly predetermined frame/edge.

A minimal surface (soap film) is produced through the isotropic surface tension (i.e., a same prestressing in all tangential directions on the surface) in the surface material (soap solution). If this minimal surface is now subjected to a pressure difference $\Delta p$, another surface is formed, the equilibrium of which is described by the Young-Laplace equation: $\Delta p = 2\alpha H$.

Further, $H = \frac{1}{2}(1/R1 + 1/R2)$, in which H represents an average curvature, R1 and R2 represent radii of curvature, and $\alpha$ represents a factor proportional to stiffness of the material. Since the value $\alpha$ is very large compared to $\Delta p$ for fiber composite material, the equation $H = \Delta p/(2\alpha)$ will be very small, so that the minimal surface condition $H \equiv 0$ remains satisfied in practice. Thus, the optimal surface in terms of weight deviates only slightly from the minimal surface for the internal cabin pressure observed in the aircraft fuselage due to the high material stiffness.

Compared to an arbitrarily determined or straked surface, the minimal surface under normal pressure behaves in a much more stable manner and thus has more bearing capacity. The straked surface buckles locally at a lower pressure level than the minimal surface.

In architecture, minimal surfaces are simulated with the aid of silk stockings. When the contour of the minimal surface has to be modified due to a pressure difference, this is carried out via a one-sided prestressing. For the silk stocking this means that it is stretched more in one direction, typically the main direction, than in the second direction.

Figure 5:
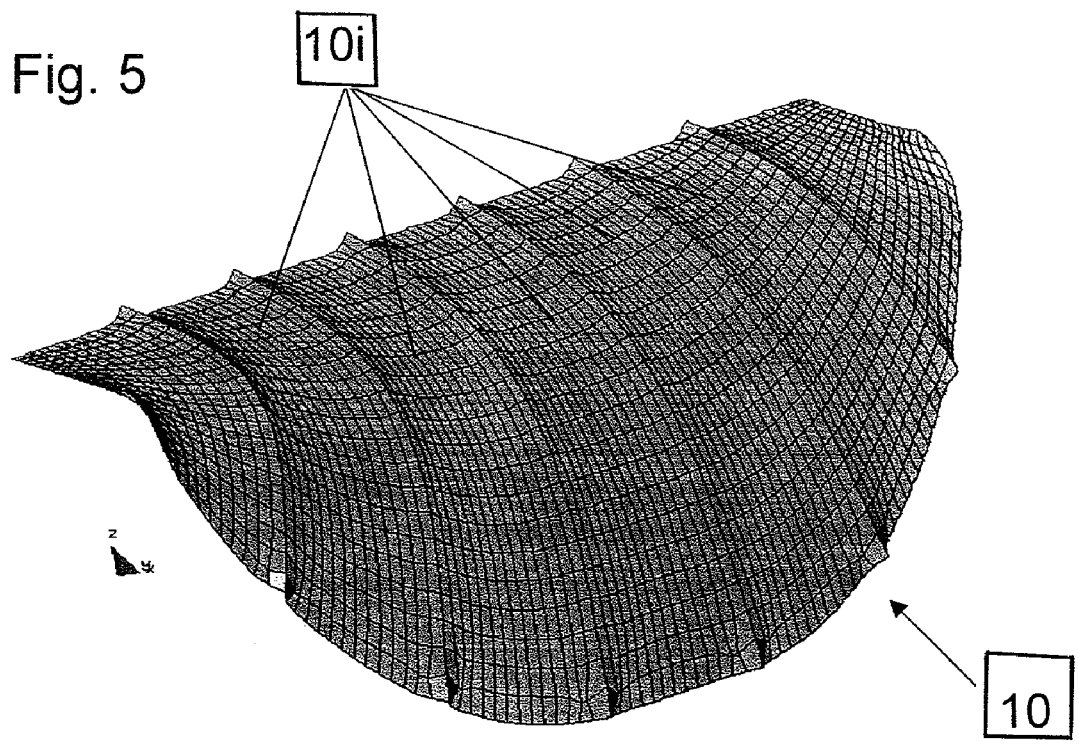
FIG. 5 illustrates a pressure bulkhead according to the invention embodied or formed with several saddle surfaces.

In order to deal with the prevailing pressure difference, the curvatures of the minimal surface may be modified through an orthotropic prestressing. The partial areas 10$i$ shown in FIG. 5 are depressed by the increase of a prestressing in the direction of the curved lateral boundaries until they meet the Young-Laplace condition. These partial areas ultimately bear the internal cabin pressure with purely normal stress (without bending stress) and are therefore optimal in terms of weight.

Figure 4:
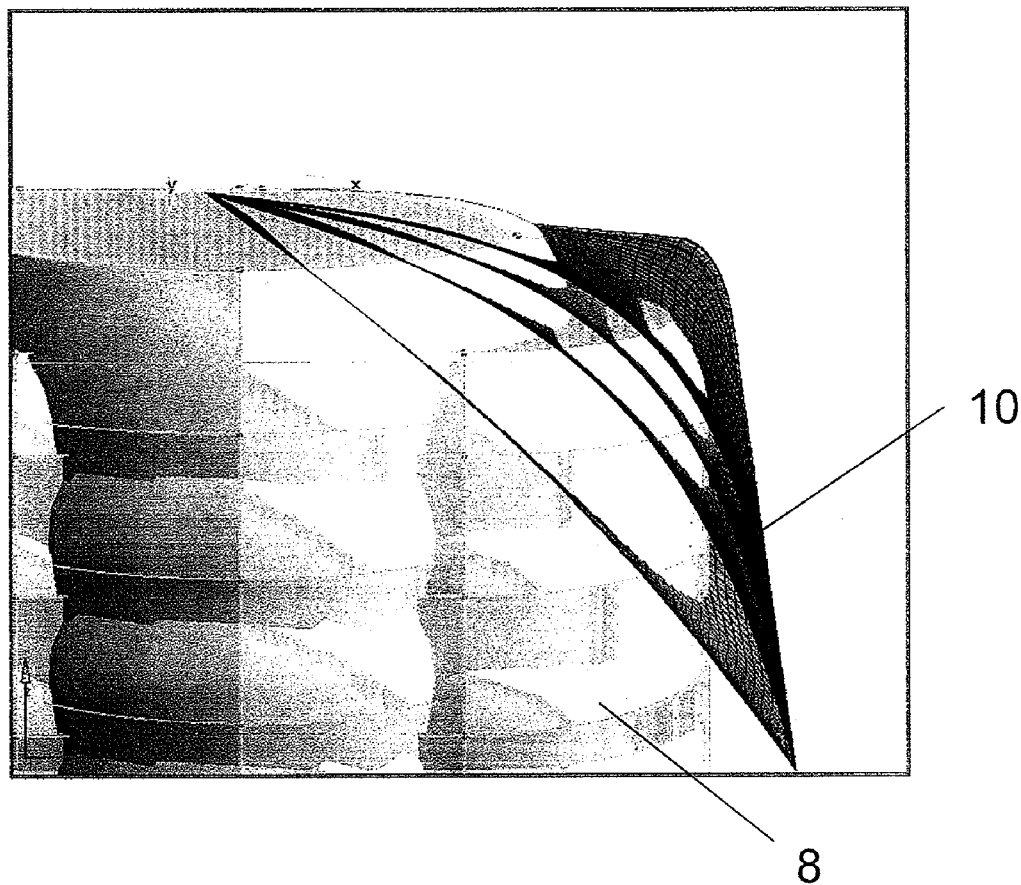
FIG. 4 is an exemplary illustration for generating a one-sided (orthotropic) prestressing to modify the pressure bulkhead to take into account, e.g., construction space limitation.

This one-sided prestressing can also be used in order to eliminate conflicts in terms of construction space. In FIG. 4, an elastic layer 100 representing the saddle surface can be stretched over a body 8, which in this case, e.g., has the shape of an envelope curve of the landing gear. The modified shape of the saddle surface may be obtained through the application of an additional prestressing in the transverse direction (i.e., perpendicular to the image plane), which shape is adapted to the structural conditions. The increase of the prestressing is carried out until the geometric framework conditions have been met.

The described approach is ideally suitable for a production with fiber composite materials, since the main fiber direction (material axis) of the fibers or fabric used can be easily adapted.

The bearing capacity of a shell having a contour calculated by prestressing in the above-described manner is still higher than that of a straked surface. This contour of a suitably prestressed surface thus leads to an optimal solution in terms of weight in order to conform to a construction space limitation within the aircraft structure.

With respect to its stiffness and thus its bearing behavior, the saddle surface can be improved by subdividing it into smaller anticlastic partial surfaces 10$i$ according to the example shown in FIG. 5.

For further optimization, the minimal surfaces or the surfaces modified by prestressing are determined for them in turn. With regard to their respective bearing behavior, these partial surfaces 10$i$ behave as described above, but support one another reciprocally. The rim of the partial areas 10$i$ is thereby necessarily stiffer than the partial area itself. An anticlastic surface that is divided in the longitudinal direction into many small partial areas is reminiscent of the contour of a scallop.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A pressure bulkhead for an aircraft, comprising:
   at least one anticlastic shaped surface element having a plurality of anticlastic partial surface elements arranged adjacent each other to form a scallop shell surface shape.

2. The pressure bulkhead in accordance with claim 1, wherein the at least one anticlastic surface element corresponds to a minimal surface.

3. The pressure bulkhead in accordance with claim 2, wherein the at least one anticlastic surface element is formed with an elastic layer that is modifiable for adjustment to at least one of predetermined construction space restrictions and interior pressure according to an orthotropic prestressing method.

4. The pressure bulkhead in accordance with claim 1, wherein the at least one anticlastic shaped surface element is formed of a fiber composite material.

5. The pressure bulkhead in accordance with claim 1, wherein the plurality of anticlastic shaped surface elements respectively correspond to a minimal surface.

6. The pressure bulkhead in accordance with claim 1, wherein at least one of the plurality of anticlastic shaped surface elements is formed with an elastic layer that is modifiable for adjustment to at least one of predetermined construction space restrictions and interior pressure according to an orthotropic prestressing method.

7. The pressure bulkhead in accordance with claim 1, wherein the plurality of anticlastic shaped surface elements is formed of a fiber composite material.

8. A method of manufacturing an aircraft, comprising:
   forming a bulkhead with at least one anticlastic shaped surface element; and
   coupling the bulkhead to a fuselage of the aircraft,
   wherein the at least one anticlastic shaped surface element comprises a plurality of anticlastic shaped partial surface elements arranged adjacent each other to form a scallop shell shaped surface.

9. The method in accordance with claim 8, wherein the at least one anticlastic shaped surface element is formed to correspond to a minimal surface.

10. The method in accordance with claim 8, further comprising modifying the at least one anticlastic shaped surface element through an orthotropic prestressing method on an elastic layer to adjust for at least one of predetermined construction space restrictions and interior pressure.

11. The method in accordance with claim 8, wherein the at least one anticlastic shaped surface element is formed of a fiber composite material.

12. An aircraft, comprising:
   a bulkhead having a saddle shape with a radius of curvature on each surface; and
   a fuselage to which the bulkhead is coupled,
   wherein the saddle shape comprises a plurality of saddle shaped partial surface elements arranged adjacent each other to form a scallop shell shaped surface.

13. The aircraft in accordance with claim 12, wherein the bulkhead is formed of a fiber composite material.

14. The aircraft in accordance with claim 12, wherein the bulkhead comprises a unitary construction.

15. The aircraft in accordance with claim 12, wherein the plurality of adjacently arranged saddle shaped partial surface elements comprises anticlastic shaped elements.

16. The aircraft in accordance with claim 1, wherein the at least one anticlastic shaped surface element comprises a unitary construction.

17. The aircraft in accordance with claim 8, wherein the at least one anticlastic shaped surface element comprises a unitary construction.

18. The aircraft in accordance with claim 1, wherein rims of adjacent anticlastic shaped partial surfaces are connected to one another.

19. The aircraft in accordance with claim 8, wherein rims of adjacent anticlastic shaped partial surfaces are connected to one another.

20. The aircraft in accordance with claim 12, wherein rims of adjacent saddle shaped partial surfaces are connected to one another.

* * * * *